July 15, 1969 HIDESUKE YAMAMOTO 3,455,372
CONTINUOUS PADDING METHOD USING HIGH FREQUENCY CURRENT
Filed Nov. 16, 1967 2 Sheets-Sheet 1
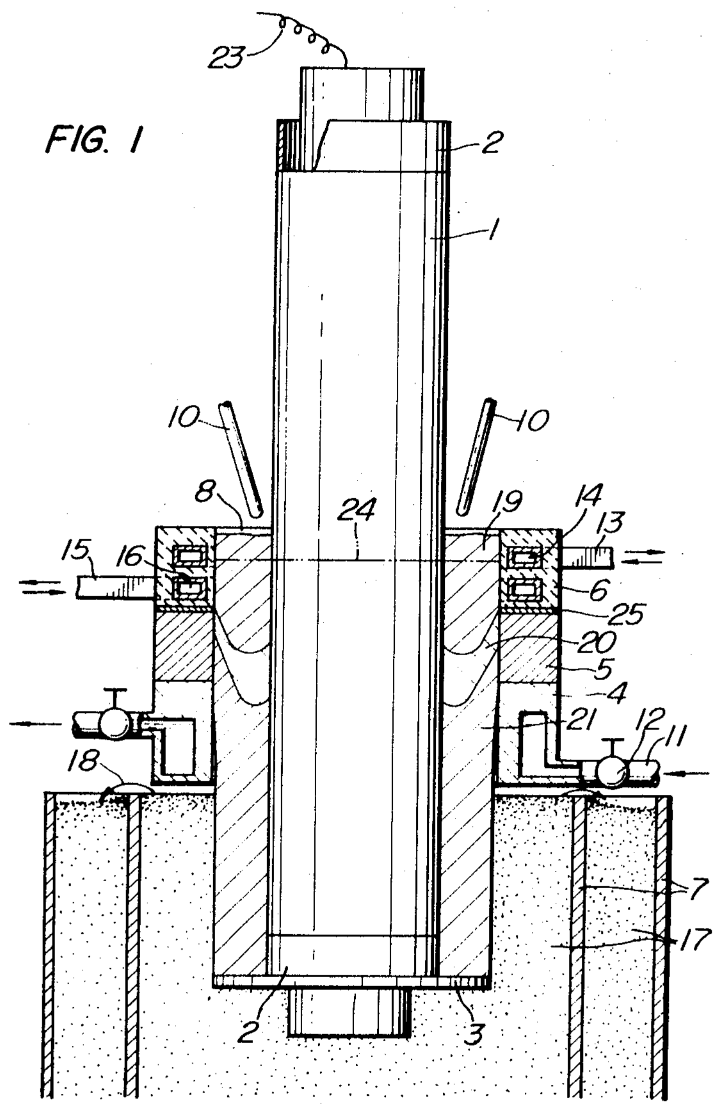
INVENTOR
Hidesuke Yamamoto
BY Hall, Pollock & Vande Sande
ATTORNEY CONTINUOUS PADDING METHOD USING HIGH FREQUENCY CURRENT
Filed Nov. 16, 1967 2 Sheets-Sheet 2
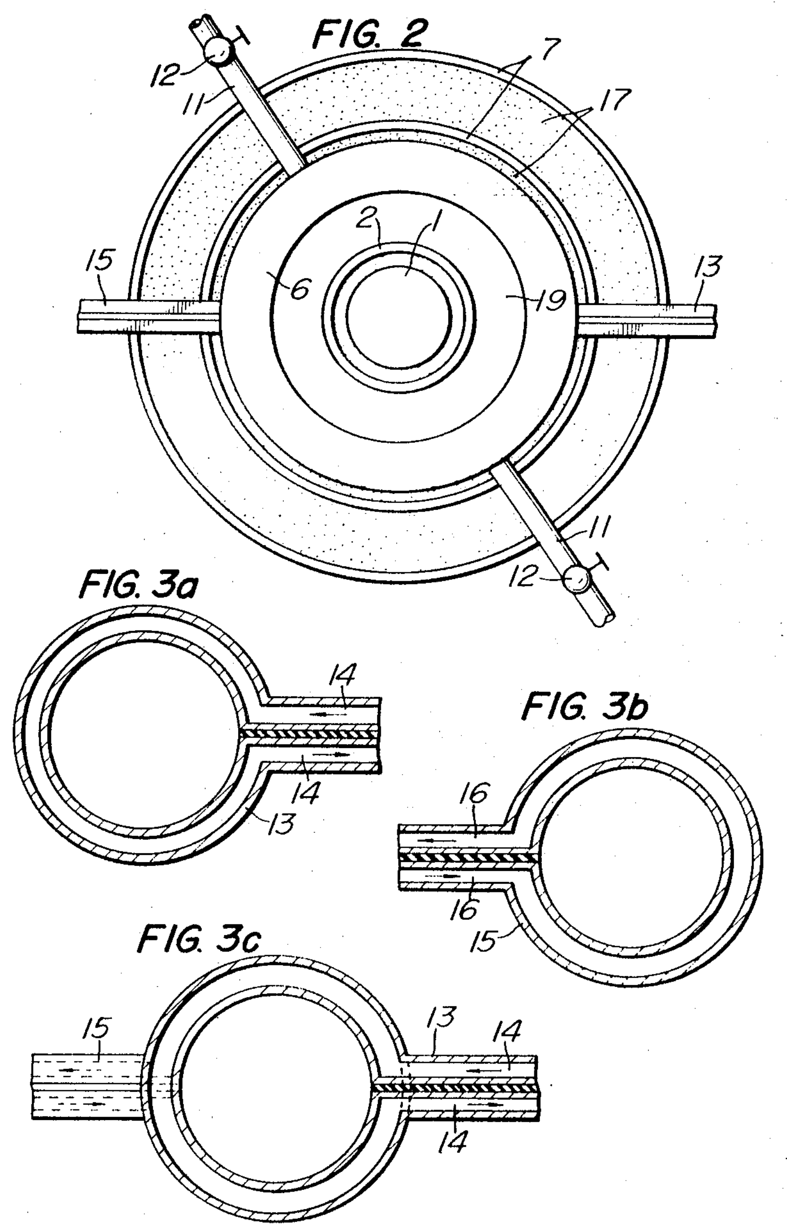
INVENTOR
Hidesuke Yamamoto
BY Hall, Pollock + Vande Sande
ATTORNEY 3,455,372

CONTINUOUS PADDING METHOD USING HIGH FREQUENCY CURRENT

Hidesuke Yamamoto, 1908, Kamitozu-Miyakomachi, Kokura-ku, Kitakyushu-shi, Japan

Filed Nov. 16, 1967, Ser. No. 683,515
Claims priority, application Japan, Mar. 8, 1967, 42/14,137
Int. Cl. B22d *19/10, 11/02*
U.S. Cl. 164—92 1 Claim

ABSTRACT OF THE DISCLOSURE

A continuous padding method using high frequency current, which comprises preheating the surface of a core material by moving said core material up and down through a mold assembly composed of a heating mold, buffer mold and cooling mold and, after returning said core material to a predetermined position, moving it downwardly slowly through said mold assembly while pouring a melt of padding material into the gap between the core material and the mold assembly, whereby the melt is bonded to the surface of the core material, cooled to some extent within the buffer mold, and cooled and solidified rapidly within the cooling mold to form a layer of pad on the surface of said core material.

The present invention relates to a method of continuously padding the surface of a roll which has become unserviceable due to excessive reduction in diameter caused by the wear of the hard layer formed on the surface thereof after use for a lengthy period, or on the surface of a core material for the production of new rolls, in a desired diameter, using high frequency current and concurrently forming on said surface a hard layer of desired depth.

Conventional padding methods had the drawbacks that the hard layer formed by the padding operation is not uniform in its hardness and that the surface of the hard layer is rugged requiring a finishing operation by grinding said hard layer, with the consequence that the thickness of the hard layer after the finishing operation is so small that the product roll is not serviceable for a long period.

The present invention contemplates the provision of an improved method of padding which eliminates the foregoing drawbacks of the conventional method and which is operable at high efficiency.

The method of this invention is adapted for padding the surface of a roll which has become unserviceable due to wear, or the surface of a cylindrical core material specially produced for the production of new rolls. In carrying out the method, a mold assembly composed of a plurality of molds stacked one on another is used, said mold assembly having an inner diameter greater than the outer diameter of a core material to be used by the thickness of the padding to be formed on said core material. Namely, the mold assembly is composed of a hollow, water cooled cooling mold which is made of copper or may be made of soft steel where cast iron is used as a padding material, a buffer mold which is made of a graphite-system material and is placed on top of said cooling mold, and a heating mold which is made of such a refractory material as magnesia and is placed on top of said buffer mold, said heating mold having a hollow, water-cooled high frequency coil embedded therein. The aforesaid molds are secured in fixed positions and a high frequency current is conducted through the high frequency coil in the heating mold. A core material is first moved up and down vertically within the mold assembly to preheat the surface thereof and then is returned to a predetermined position, that is a start line. Thereafter, the core material is moved downwardly while pouring a melt of padding material of a predetermined composition, having previously been prepared separately and primarily composed of cast iron or steel, into the gap between the core material and the heating mold. The melt thus poured is melt-bonded to the surface of the core material within the heating mold by the heat induced by the high frequency current flowing through the high frequency coil embedded in said heating mold. The core material is slowly moved further downwardly and, during passage through the buffer mold, the melt having been bonded to the core material is cooled and solidified gradually from the periphery thereof, since the graphitic buffer mold has a higher heat conductivity than the ordinary refractory mold and absorbs the heat of the melt. As a result, the melt contracts to a certain degree and the unsolidified interior portion of the melt is compressed externally. Then, the core material proceeds into the hollow, water-cooled, copper cooling mold, with the melt thereon, wherein the melt is cooled rapidly by said cooling mold and thereby solidified to constitute a layer of pad, under the externally compressed dense state allowing no cavities to be formed therein. The layer of pad thus formed on the surface of the core material is immediately dipped in a lagging material contained in a tank, as required, so as to be cooled therein slowly. The method of the present invention is characterized by operating the above-mentioned steps continuously.

FIGURE 1 is a vertical cross section showing an embodiment of the apparatus for practicing the continuous padding method according to the present invention using high frequency current;

FIGURE 2 is a top plan view of the apparatus shown in FIGURE 1;

FIGURES 3A and 3B are transverse cross sections of hollow, water-cooled coils for conducting a high frequency current therethrough, which have a cooling water inlet and outlet openings provided on the right hand side and left hand side respectively; and FIGURE 3C is a transverse cross section of the coils of FIGURES 3A and 3B combined with each other.

In describing the present invention in further detail with reference to the embodiment shown in the drawings, a cylindrical core material 1 has steel annuli 2 melt bonded to the opposite ends thereof, and a steel-made annular receiving plate 3 is melt bonded to the lower edge of the lower annulus 2, said receiving plate having a width equal to the width of a pad to be formed. A hollow, water-cooled, copper cooling mold 4 has an inner diameter greater than the outer diameter of the core material 1 by the width of the pad to be formed and the interior hollow thereof is in communication with a water feed tube 11 which is provided therein with a flow regulating valve 12. This cooling mold may be made of soft steel when cast iron is used for padding. On top of the cooling mold is mounted a buffer mold 5 which is produced by compressing a graphite-system material under a compressive force of 5 to 20 kg./cm$^2$. The buffer mold 5 is further superposed by a thin annular copper plate 25, on which is mounted a heating mold 6 which is formed by stamping such a refractory material as magnesia clinker, with high frequency copper coils 13 and 15 embedded therein in symmetrical relation, said high frequency copper coils having water passages 14 and 16 formed therein respectively. The inner diameter of the annular plate 25 is equal to that of the heating mold 6. These molds are held in fixed positions respectively to constitute a mold assembly.

The core material 1, having the steel annuli 2 and the receiving plate 3 mounted thereon as described above, is suspended within the mold assembly from above or held vertically on a stand. Then, upon conducting a high frequency current through the high frequency coils 13 and 15, the core material 1 is moved up and down slowly within the mold assembly until the surface thereof is heated to about 600° C. Upon completion of the preheating, the core material 1 is held stationary in a position indicated by the dotted lines 24 in FIG. 1, with the receiving plate 3 positioned at the level of the lower end of the heating mold 6.

From the position, the core material 1 is slowly moved downwardly continuously while continuously pouring into the gap 8 between the core material and the heating mold 6 a cast iron-system or steel-system melt 19 of a prescribed composition which has previously been prepared separately. In the case of the melt being of cast iron system, no slag is required to be formed on the melt. However, when the melt is of steel system, a suitable additive is sprinkled on the melt from time to time during the pouring operation so as to form on the melt a slag phase having a basicity of the order of 1.0.

Within the heating mold 6, the melt 19 and the surface of the core material 1 are heated and melt-bonded by the induction heat of the high frequency current, and at the same time the slag and other impurities in the melt are caused to float on the surface of the melt due to convection. In this case, the gases generated are released into the atmosphere and in addition a pressure is imposed on the lower layer of the melt as a result of convection, whereby the effect of riser is brought about.

As the melt 19 proceeds into the buffer mold 5 from the high frequency heating region, the heat of the melt is absorbed by said buffer mold, since this buffer mold is formed of a graphite-system material and therefore is higher in heat conductivity than the heating mold which is formed of a refractory material. Consequently, that portion of the melt which is in contact with the inner wall surface of the buffer mold is cooled into a semisold state as indicated at 20.

The buffer mold 5 is produced under a compressive force of 5 to 20 kg./cm.² as stated earlier, so that it is capable of holding the melt therein in its shape, without being subjected to breakage, and cools the melt progressively to such an extent as to enable said melt to be solidified completely in the successive cooling mold therebelow. In this case, it is to be noted that, since the thin annular copper plate 25 is interposed between the buffer mold 5 and the heating mold 6, the heat induced by the high frequency current flowing through the coils in the heating mold, does not give any influence on the cooling function of the cooling mold.

In the cooling mold 4, the half-solidified melt from the buffer mold 5 is cooled to solid rapidly, forming a layer of pad 21. The temperature of the cooling mold 4 can be controlled by regulating the flow rate of the cooling water by manipulating the flow regulating valve 12 provided in the water feed tube 11. Accordingly, it is possible to adjust the amount of heat of the melt 19 being absorbed by the cooling mold. The cooling medium to be supplied through the feed tube 11 is not restricted only to water but may be air, gases or other suitable cooling medium.

The melt whose surface temperature has been lowered considerably in the buffer mold 5, is cooled rapidly and solidified in this cooling mold. The thickness of the hard layer thus formed may be increased somewhat by properly selecting the cooling speed and the descending speed of the core material.

The core material with the pad formed thereon is further moved downwardly to proceed into a double-walled tank 7 filled with a lagging material 17 which consists, for example, of calcined lime powder. The outer chamber of the double-walled tank 7 is left empty before the padded core material enters the tank so as to receive the lagging material overflowing therein as indicated by the arrow 18, as the core material proceeds into the tank. This lagging tank may be eliminated by properly selecting the cooling speed of the pad in the cooling zone and the speed at which the padded core material is moved downwardly in said zone.

As described hereinabove, according to the present invention, the heating mold, buffer mold and cooling mold are stacked one on another and the core material is moved downwardly through said stack of molds in sequence while pouring the melt into the gap therebetween, whereby the pad formed on the core material is cooled slowly and then rapidly. Therefore, the surface of the pad is finished highly smoothly with no ruggedness which, in the case of direct cooling, would be caused by the internal melt bursting through the cracks formed in the solidified surface layer due to abrupt contraction of said surface layer. Further, since the heating mold and the cooling mold are spaced from each other by the buffer mold so as to avoid the functions of these molds being offset by each other and to allow the melt to be solidified to some depth, it is possible to produce a roll in a continuous operation, which has a high hardness with no irregularity.

In practicing the method of this invention, heating of the melt 19 and the surface of the core material 1 may be accelerated by an arc generated across carbon electrodes 10 and the core material and in this case the core material is grounded by an earth 23.

Now, an example of this invention will be illustrated hereunder.

(A) Core material.—As a core material, a steel tube was used which was 10 mm. in wall thickness, 146 mm. in outer diameter and 535 mm. in length, and the interior hollow of which was filled with sand.

(B) Mold assembly.—The mold assembly used had an inner diameter of 190 mm., outer diameter of 374 mm. and length of (20+50+285) mm., and was composed of three molds described below, which were stacked one on another.

(1) Magnecite clinker-made heating mold (20 mm. in length): This mold had one hollow, water-cooled, high frequency copper coil embedded therein. The coil was rectangular in cross section and was 3 mm. in thickness, 11 mm. in inner lateral length and 11 mm. in inner vertical length, and the inner diameter of said coil was 170 mm.

(2) Graphite-system material-made buffer mold (50 mm. in length): This mold was produced by compressing a material containing 50% graphite under a compressive force of 10 kg./cm.² and was provided on the top thereof with a thin annular copper plate which had a thickness of 0.3 mm. and inner diameter of 170 mm.

(3) Hollow, water-cooled, copper cooling mold (285 mm. in length): This mold had the inner wall tapered at a gradient of 3 mm. per the total length of 285 mm., the inner diameter at the top end being 234 mm. A jacket having an upper wall thickness of 35 mm., inner wall thickness of 20 mm., outer wall thickness of 10 mm., and bottom wall thickness of 10 mm., was preheated to 500° C. and compressed air was blown into the jacket from the bottom and discharged from the top thereof by a 30 HP air compressor, concurrently with the starting of the padding operation.

(C) High frequency generator used (maker: ACEC)—

| | | |
|---|---|---|
| (1) Electric motor: | | |
| Capacity | kw. | 106 |
| Efficiency on full load | percent | 92.5 |
| Power-factor on full load | do | 91.0 |
| (2) High frequency generator: | | |
| Capacity | kw. | 90 |
| Frequency | cycles | 9,600 |
| Efficiency on full load | percent | 85.5 |
| Power-factor (with condenser) | do | 100 |

(D) Padding operation:

(1) The steel tube constituting a core material was slowly moved up and down twice within the mold assembly to preheat the surface thereof to 300° to 400° C. and returned to a predetermined position. Then, the steel tube was moved downwardly through the mold assembly while continuously pouring a melt of padding material into the gap between the steel tube and the mold assembly, whereby a cast iron pad layer of 22 mm. in thickness and 435 mm. in length was formed, said melt of padding material being prepared previously and having the following composition:

| | |
|---|---|
| C=2.8% | Si=2.4% |
| Mn=0.6% | Cr=1.9% |
| Ni=0.9% | Mo=0.3% |
| P=0.05% | S=0.01% |

(2) Padding time, 11 minutes and 10 seconds; descending speed of the core material, 39 mm./min.; temperature rise of the copper mold, 500° C. (at the start of operation) to 650° C. (at the end of operation).

(E) Results—

(1) Dimension of product roll: Outer diameter of the top end (end of operation), 236.5 mm.; outer diameter of the lower end (start of operation), 234.8 mm.; the balance of 1.7 mm. is caused by the expansion of the copper mold.

(2) Hardness of pad: The padded steel tube was equally divided into four sections circumferentially and then into seven sections axially. The Shore hardnesses of the respective sections of the pad were as follows:

| | A | B | C | D | Average |
|---|---|---|---|---|---|
| End of operation | 65 | 65 | 68 | 65 | 67 |
| | 65 | 66 | 66 | 65 | 66 |
| | 65 | 68 | 67 | 67 | 67 |
| | 64 | 67 | 65 | 65 | 65 |
| | 67 | 66 | 66 | 64 | 66 |
| | 64 | 65 | 64 | 65 | 65 |
| Start of operation | 67 | 65 | 67 | 64 | 66 |
| Average | 66 | 66 | 66 | 65 | 66 |

(3) Crack: None.

(F) In the example described above, a cool air was circulated through the copper mold in order to know the variation in temperature of said copper mold. The steel tube was used as a core material for the purpose of minimizing the heat to be absorbed by the core material and thereby subjecting the copper mold to as much heat as possible of the melt. Although the conditions set forth above are the worst conditions for practicing the present invention, the operation can be carried out efficiently with excellent results and therefore a roll can be produced at low costs.

I claim:

1. In padding the surface of a core material consisting of a worn roll or a cylindrical body for the production of a new roll in a desired thickness, a continuous padding method using high frequency current, which comprises preparing a mold assembly with a refractory heating mold with a hollow water-cooled copper coil embedded therein, a graphite-system buffer mold arranged below said heating mold with a thin annular copper plate of substantially the same inner diameter as said heating mold interposed therebetween and a hollow water-cooled copper or soft steel cooling mold arranged below said buffer mold; preheating the surface of the core material by the heat induced by high frequency current conducted through said coil while moving said core material up and down vertically within said mold assembly; and continuously moving said core material downwardly through said mold assembly while continuously pouring a melt of padding material of a desired composition into the gap between said core material and the inner wall of said mold assembly, whereby the surface of said core material and said melt are melt-bonded with each other by the heat induced by the high frequency current and thereafter the melt is cooled to some extent by the buffer mold, following which the melt is cooled rapidly by the cooling mold to be solidified and hardened.

References Cited

UNITED STATES PATENTS 2,937,422 5/1960 Böhme ............. 164—86

FOREIGN PATENTS 561,363 5/1944 Great Britain.

J. SPENCER OVERHOLSER, Primary Examiner

V. RISING, Assistant Examiner

U.S. Cl. X.R.

164—86